Patented July 20, 1926.

1,593,440

UNITED STATES PATENT OFFICE.

WILLIAM R. COLLINGS, OF MIDLAND, MICHIGAN, ASSIGNOR TO THE DOW CHEMICAL COMPANY, OF MIDLAND, MICHIGAN, A CORPORATION OF MICHIGAN.

FLAKE MAGNESIUM CHLORIDE AND METHOD OF MAKING SAME.

No Drawing. Application filed November 28, 1921. Serial No. 518,240.

As is well known, the hydrated form of magnesium chloride ($MgCl_2 6H_2O$), as ordinarily manufactured, has a pronounced tendency to cake, the particles coalescing and forming a hard mass which renders the material difficult to remove from drums or other containers in which it may be packed or to handle for any purpose. The preparation of the anhydrous salt ($MgCl_2$) or indeed of any of the intermediate hydrated forms, in which the amount of water of crystallization is reduced to a point where such caking tendency is avoided, is difficult and expensive, so that such dehydration is only feasible where such anhydrous salt is required for use in a subsequent operation as, for example, in the electrolytic production of metallic magnesium.

We have discovered, however, that by a relatively simple procedure the hexa-hydrate salt may be given a glass-like finish and considerably increased hardness so that it will not cake as does ordinary magnesium chloride of 97% $MgCl_2 6H_2O$ content. To the accomplishment of the foregoing results, the invention then consists of the steps and product hereinafter fully described and particularly pointed out in the claims, the following description illustrating but one of various ways in which the principle of the invention may be used.

As indicated above, the hexa-hydrate salt, as obtained by present methods of manufacture, has a content of approximately 97% of the salt in question. We have found, however, that provided the finishing temperature of the molten magnesium chloride is run up to approximately 169 degrees C. and there maintained until the composition of the product contains an amount of magnesium chloride corresponding to from 99 to 105% $MgCl_2 6H_2O$ and such resulting product thereupon flaked or granulated, the resultant particles will take on a glass-like finish and their hardness be increased to an extent such that they will not tend to cake under ordinary conditions of storage or shipment.

It is not deemed necessary to illustrate the manner in which the granulation of the material is accomplished, but preferably the molten salt is picked up in a thin layer on a revolving drum from which it is thereupon scraped off in the form of flakes after it has had time to cool and solidify. The molten chloride, however, may be atomized or granulated in any other way and a product obtained measurably superior to the chloride at present on the market in its non-caking characteristic. Such a non-caking, flaked magnesium chloride may obviously be handled much more conveniently and economically whether it is to be utilized directly in a subsequent manufacturing operation or is to be dehydrated in order to form the anhydrous salt for use in an electrolytic process as mentioned above.

Other modes of applying the principle of my invention may be employed instead of the one explained, change being made as regards the process herein disclosed or the materials employed in carrying out the process, provided the step or steps stated by any of the following claims or the equivalent of such stated step or steps be employed.

I therefore particularly point out and distinctly claim as my invention:—

1. In the manufacture of flake magnesium chloride, the steps which consist in heating such chloride in molten condition until its composition contains an amount of magnesium chloride corresponding to from 99 to 105 per cent. $MgCl_2 6H_2O$, and then forming particles thereof, substantially as described.

2. In the manufacture of flake magnesium chloride, the steps which consist in heating the normal hexahydrate chloride in molten condition to a finishing temperature of approximately 169° C., and then forming particles thereof, substantially as described.

3. As a new article of manufacture, magnesium chloride containing slightly less than the normal amount of water of crystallization, such chloride being in the form of particles having a glass-like finish and considerably increased hardness compared with the normal hexahydrate.

4. As a new article of manufacture, a non-caking flake magnesium chloride containing an amount of magnesium chloride corresponding to from 99 to 105 per cent. $MgCl_2 6H_2O$.

Signed this 25th day of November, 1921.

WILLIAM R. COLLINGS.